United States Patent [19]

Kersey

[11] 4,245,714
[45] Jan. 20, 1981

[54] MINING VEHICLE

[76] Inventor: Frank N. Kersey, 712 Mountain La., Bluefield, Va. 24605

[21] Appl. No.: 917,085

[22] Filed: Jun. 19, 1978

[51] Int. Cl.³ .................. B60K 17/34; B60D 11/00
[52] U.S. Cl. .................. 180/265; 180/139; 180/235; 280/492; 280/782
[58] Field of Search .............. 280/492, 493, 494; 180/134, 135, 136, 137, 138, 139, 265, 266, 235

[56] References Cited

U.S. PATENT DOCUMENTS

| | | | |
|---|---|---|---|
| 2,404,362 | 7/1946 | Carlson | 280/492 |
| 2,488,676 | 11/1949 | Mayner | 280/492 |
| 2,941,612 | 6/1960 | Bernotas | 180/51 |
| 3,032,135 | 5/1962 | McAdams | 180/139 |
| 3,167,147 | 1/1965 | Symons | 180/51 |
| 3,253,671 | 5/1966 | Fielding | 180/134 X |
| 3,270,829 | 9/1966 | Steiger | 180/51 |
| 3,411,809 | 11/1968 | Kampert | 280/492 X |
| 3,630,302 | 12/1971 | Holland | 180/51 X |
| 3,773,129 | 11/1973 | Anderson | 180/51 X |
| 3,805,908 | 4/1974 | Thompson | 180/51 X |

Primary Examiner—John P. Silverstrim
Attorney, Agent, or Firm—Mason, Fenwick & Lawrence

[57] ABSTRACT

An articulated vehicle includes front and rear vehicle portions connected by a floating connector member having upper and lower vertically aligned pivot connections to the rear vehicle portion and horizontally aligned front and rear pivot connections to the front vehicle portion with wear takeup means in the pivot connections.

5 Claims, 7 Drawing Figures

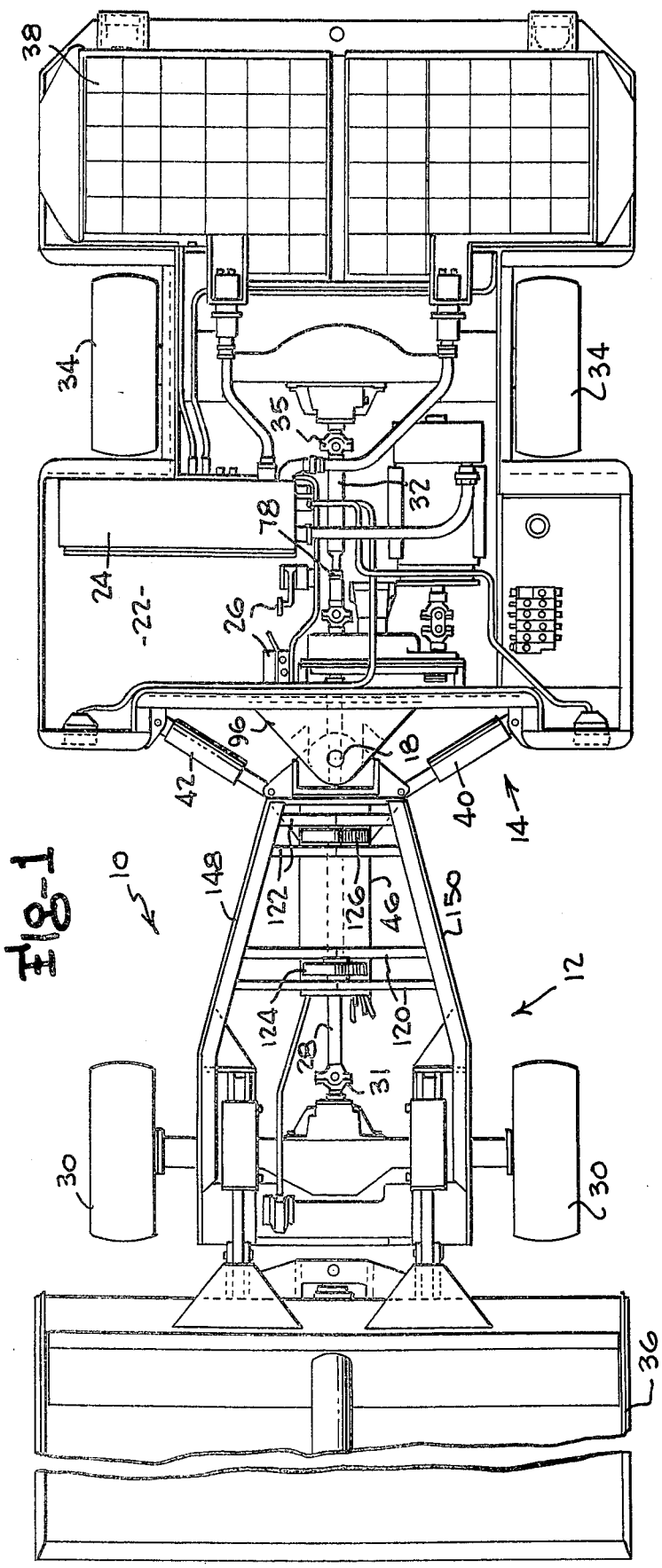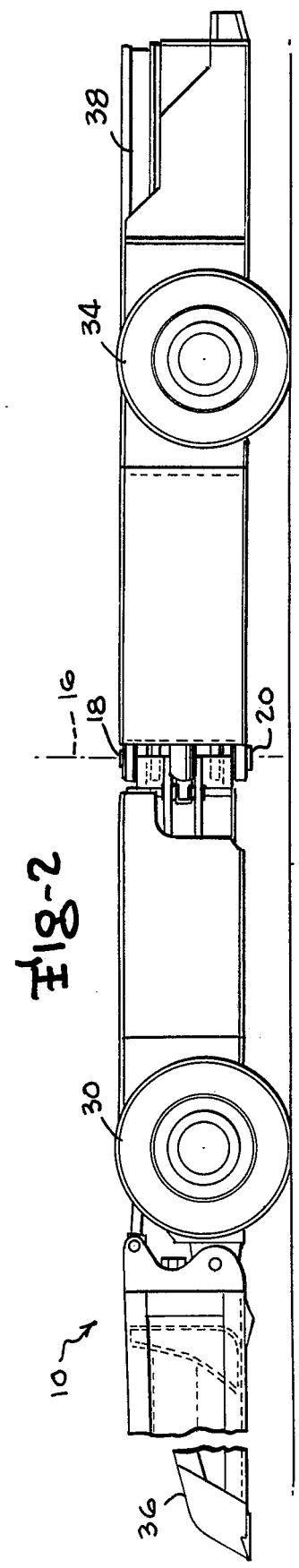

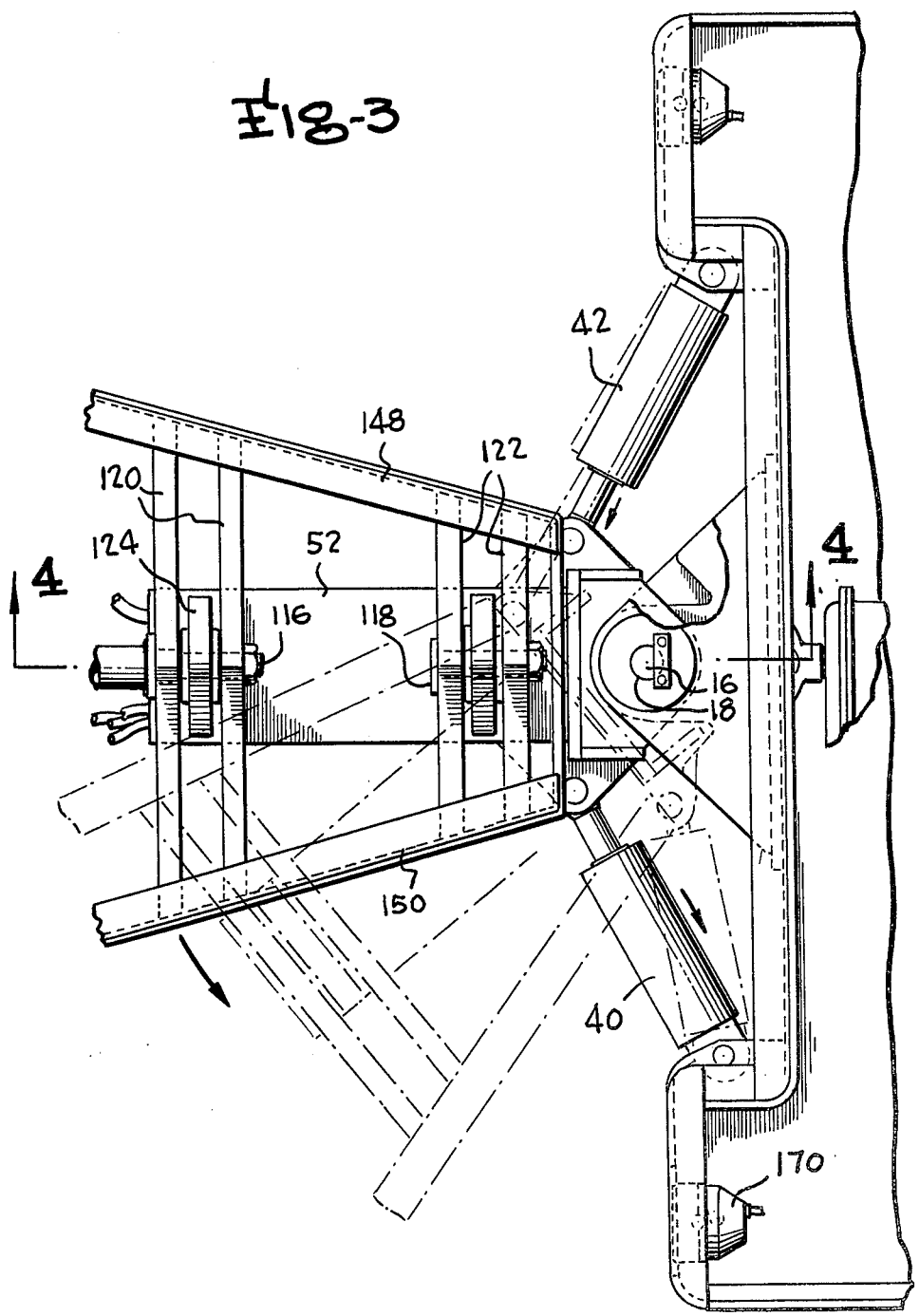

MINING VEHICLE

BACKGROUND OF THE INVENTION

This invention is in the field of land vehicles and is more particularly directed to the field of articulated vehicles and is even more specifically directed to the field of articulated mining vehicles.

Articulated vehicles have been used for many years in underground mines with such vehicles normally comprising a front vehicle portion having two supporting wheels and a rear vehicle portion having two supporting wheels with an articulation joint connecting the front and rear vehicle portions to permit the vehicle to maneuver around the sharp turns and narrow confines frequently encountered in mining operations. Since the surface over which such vehicles must be operated will frequently be rough and uneven, it is also necessary that the front and rear portions of such vehicles have the capacity for relative roll movement consisting of rotation with respect to each other about a central longitudinal horizontal axis.

Prior known mining vehicles have employed a connection between the front vehicle portion and the rear vehicle portion consisting of a relatively long cylindrical tubular rod matingly inserted in a cylindrical bushing and capable of rotation therein. Unfortunately, it has been found that the foregoing construction is highly susceptible to wear in certain areas in which the pressures of engagement between the parts are substantial due to the fact that it is impossible to keep dirt and other abrasive material out of the articulation joint formed of the cylindrical bushing and the elongated cylindrical tubular rod bearing member positioned therein. The only way in which repairs of this device can be made is by a costly and time consuming disassembly of the vehicle to effect replacement of the bushing and bearing members.

Another factor which must be considered in the design of mining machines is that the vehicle must be capable of operating in mines where the height of the mine roof is very low as frequently occurs in mines having thin seams of coal or other material being mined. It is consequently essential that all mining equipment used in such mines have as low as possible overall height. The necessity for building the vehicle as low as possible in conjunction with the necessity for permitting oscillation of the front and rear vehicle portions about a horizontal longitudinal axis and about a vertical steering axis presents substantial design problems not present in other surface operated vehicles.

Another problem with mining vehicles is that electrical cables and hydraulic lines must be provided to extend between the front vehicle portion and the rear vehicle portion which are subjected to constant relative movement with respect to each other. It is obviously essential that the electrical lines be protected from cutting or damage likely to create a short circuit and resultant arcing and it is also obviously desirable that the hydraulic line be similarly protected against damage.

Therefore, it is the primary object of this invention to provide a new and improved articulated vehicle.

Another object of the invention is the provision of a new and improved articulated mining vehicle having a minimum height and having front and rear portions capable of articulation about both a vertical axis and a horizontal axis.

A further object of the invention is the provision of a new and improved articulated mining vehicle in which the articulation means is adjustable to accommodate wear of the parts.

The foregoing and other objects of the invention are achieved by the preferred embodiment through the provision of front and rear vehicle portions in which the articulation means between the front and rear vehicle portions comprises a floating connector member between the vehicle portions connected to the front vehicle portion by first and second longitudinally horizontally aligned universal joints each including a spherical bearing sleeve fixedly mounted on the floating connector member. Front and rear horizontal pins support spherical bearings positioned in the spherical sleeves for universal motion while the rear portion of the floating connector member includes first and second vertically aligned spherical bearing sleeves universally connected to spherical bearings on upper and lower vertically aligned pivot pins connected to the front of the rear vehicle portion.

A better understanding of the manner in which the preferred embodiment achieves the foregoing objects will be enabled when the following detailed description is considered in conjunction with the appended drawings in which like reference numerals are used in different figures for the same parts.

DESCRIPTION OF THE DRAWINGS

FIG. 1 is a top plan view of the preferred embodiment of the invention;

FIG. 2 is a side elevation view of the preferred embodiment;

FIG. 3 is an enlarged plan view of the articulation joint between front and rear portions of the preferred embodiment illustrating different positions thereof as occur during a steering operation;

DESCRIPTION OF THE PREFERRED EMBODIMENT

Figure 4:
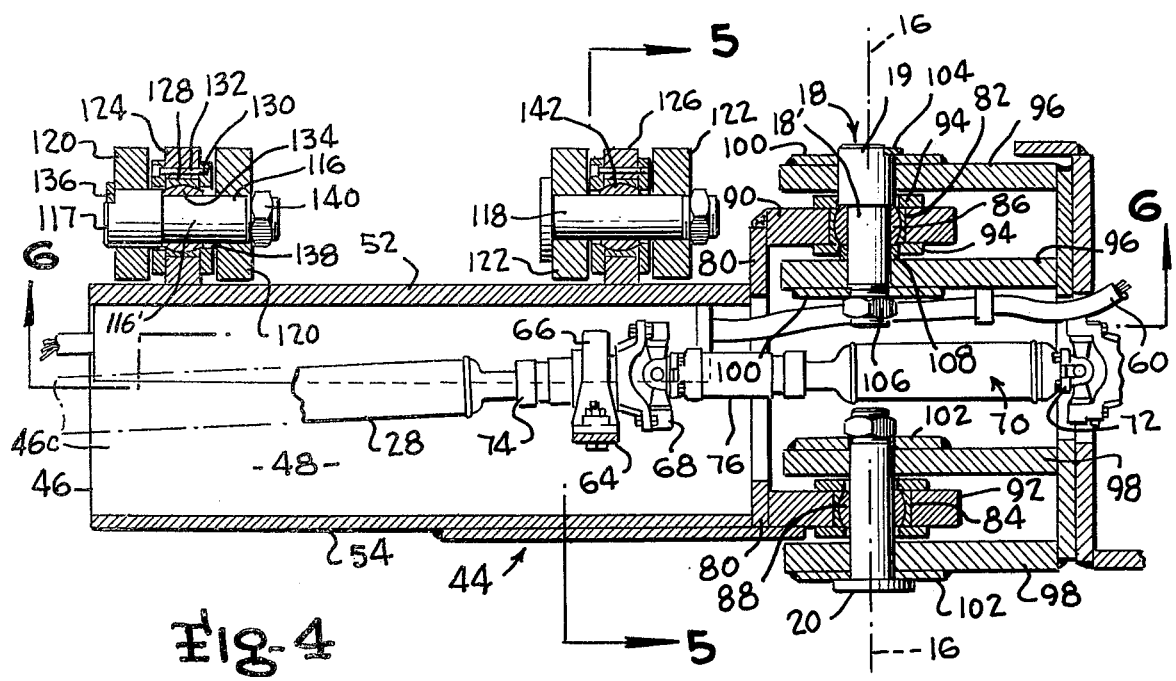
FIG. 4 is a sectional view taken along lines 4—4 of FIG. 3.

Turning initially to FIGS. 1 and 2, it will be observed that the preferred embodiment of the invention, generally designated 10, comprises an articulated mining vehicle consisting of a front vehicle portion 12 and a rear vehicle portion 14 with the front and rear vehicle portions 12 and 14 being pivotable with respect to each other about a vertical steering axis 16 (FIG. 2). The vertical steering axis 16 is coextensive with the common axis of an upper vertically oriented pivot pin 18 having a head 19 and a main cylindrical body portion 18' and a lower vertically oriented pivot pin 20 which are best illustrated in FIG. 4.

A conventional motor, transmission and control means is provided in the rear vehicle portion 14 and is controlled by the operator who occupies a control position 22 which includes a driver seat 24 accessible to conventional control means 26 as will be apparent from inspection of FIG. 1. A front wheel drive shaft 28 drives the front wheels 30 through a universal joint 31 and a shorter rear wheel drive shaft 32 drives the rear wheels 34 through a universal joint 35. The front of the front vehicle portion 12 is provided with a scoop 36 of conventional construction with the rear vehicle portion including an electric motor and battery storage compartment 38 of well-known construction.

Articulated movement of the front vehicle portion 12 with respect to the rear vehicle portion 14 about the vertical steering axis 16 is effected by simultaneous actuation of first and second cylinders 40 and 42 which are always actuated in an opposite manner to effect the steering function. In other words, the cylinder 42 is extended while the cylinder 40 is being retracted and vice versa.

Figure 5:
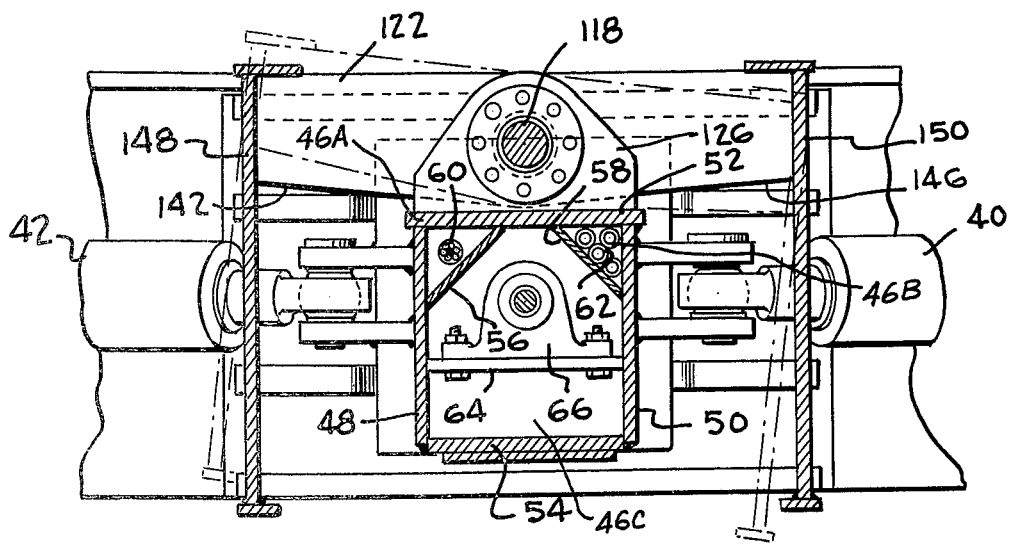
FIG. 5 is a sectional view taken along lines 5—5 of FIG. 4.
Figure 6:
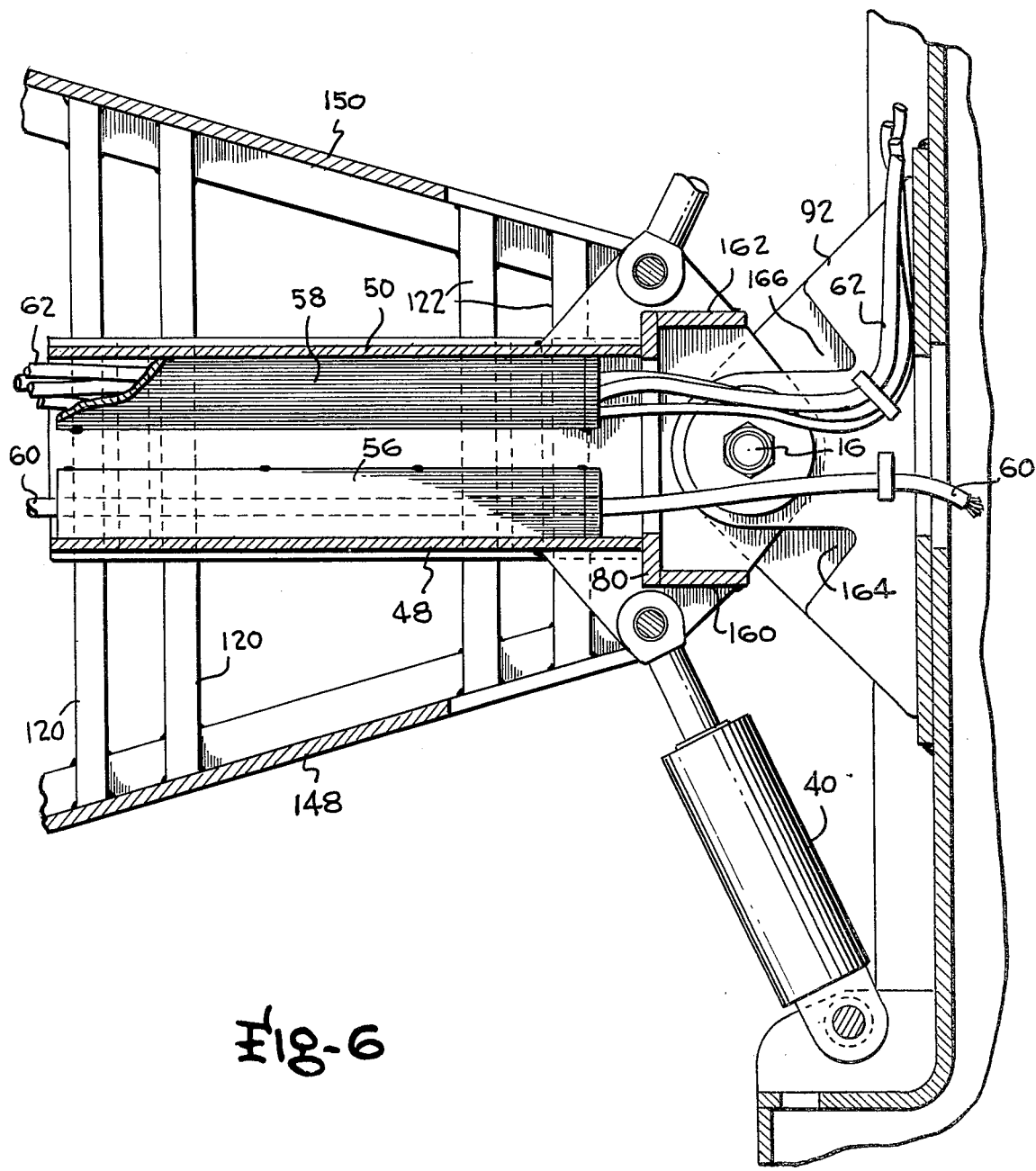
FIG. 6 is a sectional view taken along lines 6—6 of FIG. 4.
Figure 7:
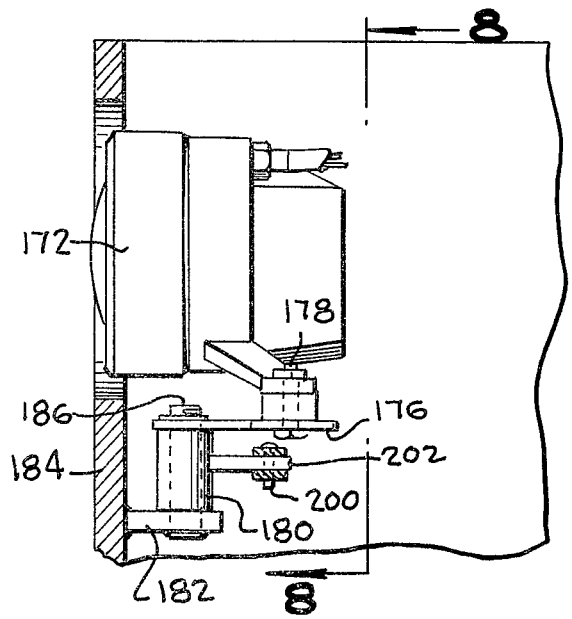
FIG. 7 is a sectional view taken along lines 7—7 of FIG. 3.
Figure 8:
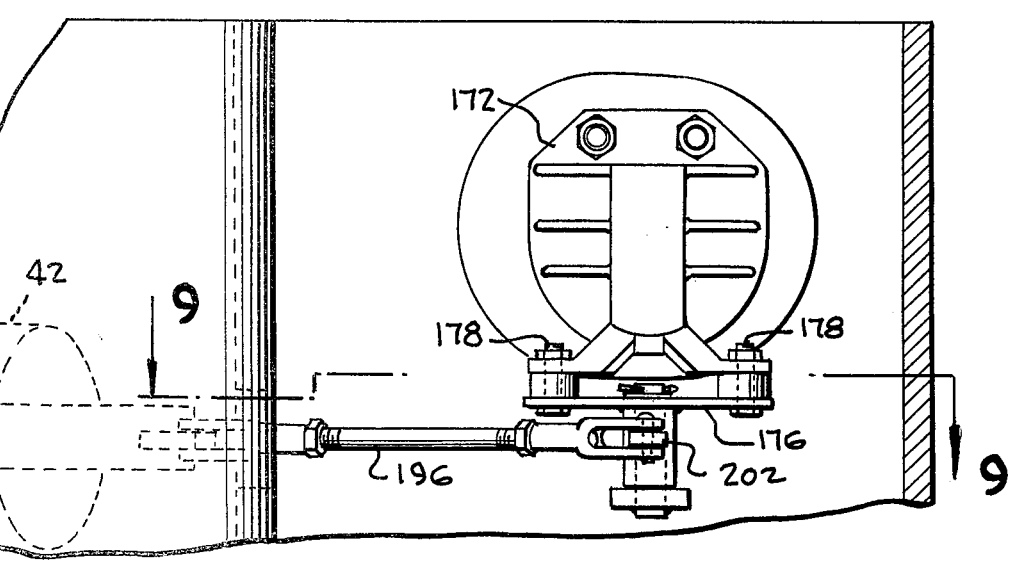
Figure 9:
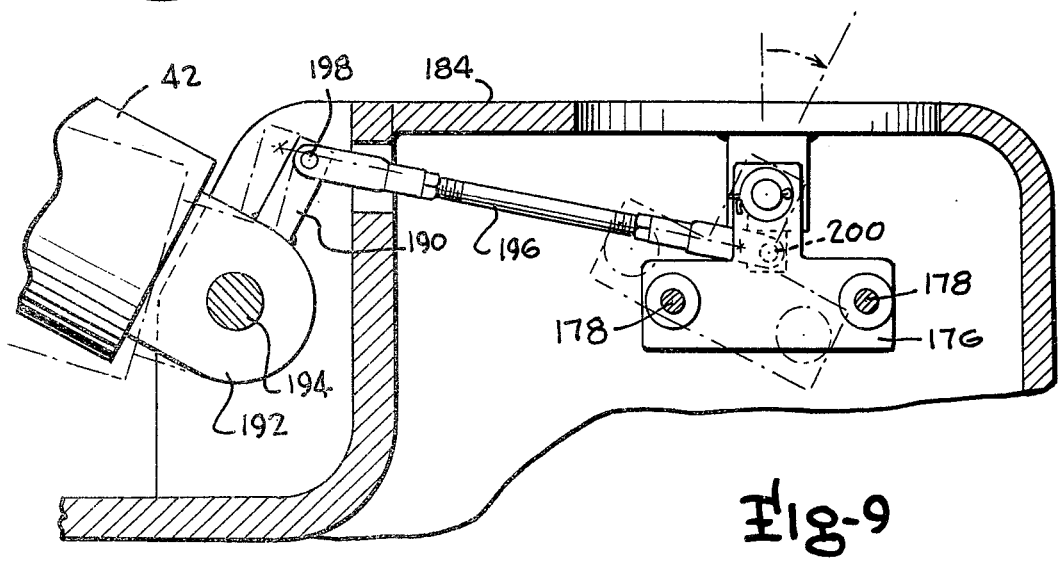

The articulation connection between the front vehicle portion 12 and the rear vehicle portion 14 more specifically includes a floating connector member, generally designated 44 in FIG. 4, which includes a hollow rigid tube 46 of approximately square cross-sectional configuration, formed of vertical side plates 48 and 50, an upper plate 52 and a lower plate 54 as best shown in FIG. 5. Additionally, internal divider panels in the form of diagonal corner plates 56 and 58 are provided on the interior of the hollow rigid tube 46 with the diagonal corner plate 56 cooperating with plates 48 and 52 to define an elongated longitudinally extending compartment 46A through which one or more electrical power and control cables 60 extends. Similarly, the diagonal corner plate 58 cooperates with the side plate 50 and top plate 52 to define a second elongated longitudinally extending compartment 46B through which hydraulic lines 62 extend. A third longitudinally extending compactment 46C is provided by the remaining internal portion of hollow rigid tube 46 below and between corner plates 56 and 58; thus, the plates 56 and 58 serve as divider panels which divide tube 46 into three longitudinally extending mutually isolated compartments 46A, 46B and 46C. A transverse support plate 64 is welded to the vertical side plates 48 and 50 and provides support for a rotary bearing 66 which supports the rear end of the front wheel drive shaft 28 as shown in FIG. 4. The floating connector member 44 also includes a front plate 80 provided with an aperture through which the drive components, the electrical cable and the hydraulic lines extend to their associated components in the rear vehicle portion 14.

A universal coupling 68 is connected to the drive shaft 28 and receives power from a short drive shaft 70 connected to the main electric drive motor by a universal coupling 72. Splined couplings 74 and 76 permit relative axial movement of the drive components during operation of the vehicle while always maintaining the driving connection from the motor to the front wheels 30. Similarly, a splined coupling 78 is connected to the rear wheel drive shaft 32. Upper and lower spherical bearing sleeves 82 and 84 are supported on parallel upper and lower horizontal pivot pin support plates 90 and 92 as best illustrated in FIG. 4.

An upper spherical bushing 86 is fitted over the upper pin 18 and is positioned in the upper sleeve 82 while a lower spherical bushing 88 is similarly fitted on the lower vertical pivot pin 20 and received in the lower spherical bearing sleeve 84. It should be observed that the upper spherical bearing sleeve 82 is supported in the upper bearing sleeve support plate 90 and the lower spherical bearing sleeve 84 is supported in a lower bearing sleeve support plate 92 with both of the bearing sleeve support plates being welded to the front plate 80 so as to constitute a portion of the floating connector member. Bearing caps 94 are provided on opposite sides of the upper bearing sleeve support plate and are held in position by conventional connectors (not shown) such as a threaded bolt or the like extending between the bearing caps through the upper bearing sleeve support plate 90.

The upper pivot pin 18 is mounted in an upper pair of horizontal pivot pin support plates 96 while the lower pivot pin 20 is supported in a lower pair of horizontal pivot pin support plates 98. The plates 96 and 98 are fixedly welded to the front of the frame of the rear vehicle portion 14. Reinforcing plates 100 are welded to the upper pair of horizontal pivot pin support plates 96 and similar reinforcing plates 102 are welded to the lower pair of plates 98; a rotation preventing bar 104 is welded to the reinforcing plate 100 and extends chordally across a recess in the head 19 of the pin 18 to prevent rotation of the pin. The opposite end of the pin 18 is threaded to receive a clamp nut 106. The pivot pin 18 is capable of axial movement in the upper spherical bushing 88 which is in turn capable of pivotal movement in the upper spherical bearing sleeve 82 to provide for universal movement of the pin to a limited extent and tightening of the nut 106 brings the head 19 of the pin forcefully against the upper face of the upper spherical bushing 86 to adjust any looseness out of the connection as will occur upon wear of the component parts such as the lower face of the head 19 and/or the upper and lower faces of the upper spherical bushing 86. In this regard, it should be noted that an annular wear ring or shim 108 is provided between the lower face of the upper spherical bushing 86 and the upper surface of the lower plate 96. After wear ring 108 becomes sufficiently worn, it can easily be replaced without disassembly of the machine to maintain proper operation of the pivotal connection effected by means 18 etc. The lower pin 20 is a floating pin in that the pin floats in the lower spherical bushing 88 and is capable of axial movement therein since there is no clamping operation of the pin of the type provided by the upper pin with respect to its spherical bushing.

Limited rotational movement of the front vehicle portion with respect to the rear vehicle portion about a horizontal axis is permitted by means including a front pivot pin 116 identical to upper pivot pin 18 and a rear pivot pin 118 identical to lower pivot pin 20.

The front pivot pin 116 is mounted in a front pair of transverse parallel support bars 120 with a rear pair of parallel transverse support bars 122 receiving the rear pivot pin 118. A front bearing support block 124 is welded to the upper surface of the hollow rigid tube 46 and a rear bearing support block 126 is similarly welded to the upper surface of the hollow rigid tube 46 with the block 124 being positioned between the front support bars 120 and the block 126 being positioned between the rear support bars 122. Front bearing support block 124 supports a front spherical bearing sleeve 128 held in position by bearing caps 130 which are in turn held in position by a retainer bolt 132. A front spherical bushing 134 is received in the bearing sleeve 128 for pivotal movement therein and is matingly fitted over the surface of front pin 116. Pin 116 includes a main cylindrical body portion 116' of given diameter and a cylindrical head portion 11 of greater diameter coaxial therewith. A rotation preventing bar 136 engages a recess in the head 117 of pin 116 to prevent rotation of the pin in the same manner that the bar 104 prevents rotation of pin 18. A wear ring 138 is provided between the rear surface of the bushing 134 and the forward surface of the rearmost support bar 120 with a clamp nut 140 providing adjustment of the components in the same manner that the clamp nut 106 provides adjustment of the components associated with the upper vertical pivot pin 18.

It is consequently possible to accommodate a certain amount of wear by tightening of the nut 140 with the relationship of the pin 116 to bars 120 being identical to that of pin 18 to the plates 96. Similarly, the pin 116 operates in the same manner with respect to the front bearing support block 124 as pin 18 does with respect to the upper bearing sleeve support plate 90.

The rear pivot pin 118 is a floating pin with respect to a spherical bushing 142 in which it is mounted in exactly the same manner that the lower pin 20 is mounted in the bushing 88. Pin 118 is consequently capable of pivotal movement with respect to the block 126 and is also capable of a limited amount of axial movement.

Front and rear pivot pins 117 and 118 are axially aligned and are in general horizontal alignment with the upper spherical bushing 86. Pivotal movement of the front vehicle portion about the axis of pins 117 and 118 is permitted by virtue of the fact that the support bars 120 and 122, have canted lower surfaces illustrated by the canted lower surfaces 142 and 146 of the bar 122 illustrated in FIG. 5. The outer ends of the bars 120 and 122 are welded to side frame members 148 and 150 of the frame of the front vehicle portion 12. Consequently, the front vehicle portion can pivot about a horizontal axis coextensive with the axis of pins 116 and 118 so that the bars move between the solid and dotted line positions such as illustrated in FIG. 5. During such a pivotal movement, the limits of such movement are defined by engagement of the surfaces 142 or 146 with the upper surface of plate 52 as will be apparent from FIG. 5.

Stop plates 160 and 162 are welded to opposite sides of the front plate 80 to move into first and second slots 164 and 166 respectively which are provided in the lowermost of plates 96 and the uppermost of plates 98. Engagement of the plates 160, 162 with the inner extent of their slots 164, 166 limits the extent of pivotal movement of the front vehicle portion with respect to the rear vehicle portion and vice versa.

Consequently, it will be seen that the preferred embodiment permits an extremely low overall height with the unique articulation means being easily adjusted to accommodate wear without their being any need for disassembly of the machine or replacement of parts as has been the case with previously known articulated mining vehicles. While numerous modifications of the preferred embodiment will undoubtedly occur to those of skill in the art, it should be understood that the spirit and scope of the invention is to be limited solely by the appended claims.

I claim:
1. An articulated vehicle including:
a first frame portion;
a second frame portion;
articulation means joining said first frame portion and said second frame portion, said articulation means including:
   a floating connector member;
   upper and lower spherical bearing sleeves fixedly mounted between said floating connector member and one of said frame portions;
   said floating connector member including an elongated horizontal hollow rigid linear tube member of generally square cross-section including internal divider panels defining three longitudinally extending mutually isolated compartments; and upper and lower vertically spaced horizontal bearing sleeve support plates mounted on and extending from one end of said elongated horizontal rigid linear tube member with said upper and lower spherical bearing sleeves being respectively mounted in said upper and lower horizontal bearing sleeve support plates;
   front and rear spherical bearing sleeves fixedly mounted between the other of said frame portions and said floating connector member;
   upper and lower vertically oriented aligned pivot pins;
   an upper spherical bushing mounted on said upper pivot pin and matingly positioned in said upper spherical bearing sleeve to permit limited universal pivotal movement of said upper pivot pin with respect to said upper spherical bearing sleeve;
   a lower spherical bushing mounted on said lower pivot pin and matingly positioned in said lower spherical bearing sleeve to permit limited universal pivotal movement of said lower pivot pin with respect to said lower spherical bearing sleeve;
   front and rear axially horizontally oriented and aligned pivot pins;
   a front spherical bushing mounted on said front pivot pin and matingly positioned in said front spherical bearing sleeve to permit limited pivotal movement of said front pivot pin with respect to said front spherical bearing sleeve; and
   a rear spherical bushing mounted on said rear pivot pin and matingly positioned in said rear spherical bearing sleeve to permit limited movement of said rear pivot pin with respect to said rear spherical sleeve.
2. The vehicle of claim 1 additionally including mechanical drive transmission means extending through one of said longitudinally extending mutually isolated compartments to provide mechanical power from motor means on one of said frame portions to driven means on the other of said frame portions.
3. The vehicle of claim 2 additionally including hydraulic hose means extending through a second one of said longitudinally extending isolated compartments.
4. The vehicle of claim 3 additionally including electrical power cable extending through a third one of said longitudinally extending isolated compartments.
5. An articulated vehicle including:
a first frame portion;
a second frame portion;
articulation means joining said first frame portion and said second frame portion, said articulation means including:
   a floating connector member;
   upper and lower spherical bearing sleeves fixedly mounted between said floating connector member and one of said frame portions;
   front and rear spherical bearing sleeves fixedly mounted between the other of said frame portions and said floating connector member;
   upper and lower vertically oriented aligned pivot pins;
   an upper spherical bushing mounted on said upper pivot pin and matingly positioned in said upper spherical bearing sleeve to permit limited univer- sal pivotal movement of said upper pivot pin with respect to said upper spherical bearing sleeve;

a lower spherical bushing mounted on said lower pivot pin and matingly positioned in said lower spherical bearing sleeve to permit limited universal pivotal movement of said lower pivot pin with respect to said lower spherical bearing sleeve;

front and rear axially horizontally oriented and aligned pivot pins;

a front spherical bushing mounted on said front pivot pin and matingly positioned in said front spherical bearing sleeve to permit limited pivotal movement of said front pivot pin with respect to said front spherical bearing sleeve;

a rear spherical bushing mounted on said rear pivot pin and matingly positioned in said rear spherical bearing sleeve to permit limited movement of said rear pivot pin with respect to said rear spherical sleeve;

wherein the upper spherical bushing on said upper spherical bushing on said upper pivot pin is in approximate horizontal alignment with said front and rear pivot pins and wherein said floating connector member includes:

an elongated linear hollow rigid tube member; and upper and lower vertically spaced horizontal bearing sleeve support plates mounted on and extending from said elongated linear hollow rigid tube member in which said upper and lower spherical sleeves are respectively mounted;

wherein said upper pivot pin is mounted on and between an upper pair of horizontal pivot pin support plates fixedly connected to said one frame portion;

said upper bearing sleeve support plate is positioned between said upper paid or horizontal pivot pin support plates;

said lower pivot pin is mounted on and between a lower pair of horizontal pivot pin support plates fixedly connected to said one frame portion;

said lower bearing sleeve support plate is positioned between the plates of said pair of lower bearing sleeve support plates; and additionally including first and second stop defining means rigidly connected to said hollow rigid tube member engageable with opposite sides of at least the lowermost one of the horizontal pivot pin support plates to define the limits of pivotal movement of the rigid hollow tubular member about the axes of said upper and lower vertically aligned pivot pins.

* * * * *